INVENTORS
BERNARD WIDROW
MARCIAN E. HOFF, JR.
BY
ATTORNEYS

United States Patent Office 3,454,753
Patented July 8, 1969

3,454,753
ANALOG MULTIPLIER AND MODULATING CIR-
CUITS EMPLOYING ELECTROLYTIC ELEMENTS
Bernard Widrow, 775 Esplanada Way, Stanford, Calif.
94305, and Marcian E. Hoff, Jr., 1635 S. Springer Road,
Mountain View, Calif. 94040
Continuation-in-part of application Ser. No. 136,829,
Sept. 8, 1961. This application Aug. 19, 1965, Ser.
No. 481,042
Int. Cl. G06g 7/16, 7/18
U.S. Cl. 235—194                 3 Claims

ABSTRACT OF THE DISCLOSURE

Adaptive memory elements of the type using electronically controlled variable resistor are used to provide an improved multiplier and modulating circuits. The resistance can be reversibly changed by DC current flowing in a source lead which plates a metallic film on a substrate causing the electrical conductance of the substrate to change. Modulation is provided by coupling the adaptive circuit element into a feedback loop into which the modulating signal is applied. A multiplying action between two different signals is accomplished by one signal modulating a carrier which in turn is modulated by the adaptive memory element and the second signal; the resultant is then filtered at the carrier signal and demodulated.

This application is a continuation-in-part of copending application Ser. No. 136,829, filed Sept. 8, 1961, now patent No. 3,222,654.

This invention relates generally to a circuit employing memory elements and more particularly to integrators and multipliers employing adaptive memory elements.

In said copending application, there is described an electronically controlled variable resistor which has analog memory. Its resistance can be reversibly changed by DC current flowing in a "source" lead which plates a metallic film on a "substrate," causing the electrical conductance of the substrate to change.

It is a general object of the present invention to provide improved integrator, multiplier and modulating circuits employing adaptive memory elements of the foregoing character.

The foregoing and other objects of the invention will become more clearly apparent from the following description when taken in conjunction with the accompanying drawing.

Referring to the drawing.

Figure 1:
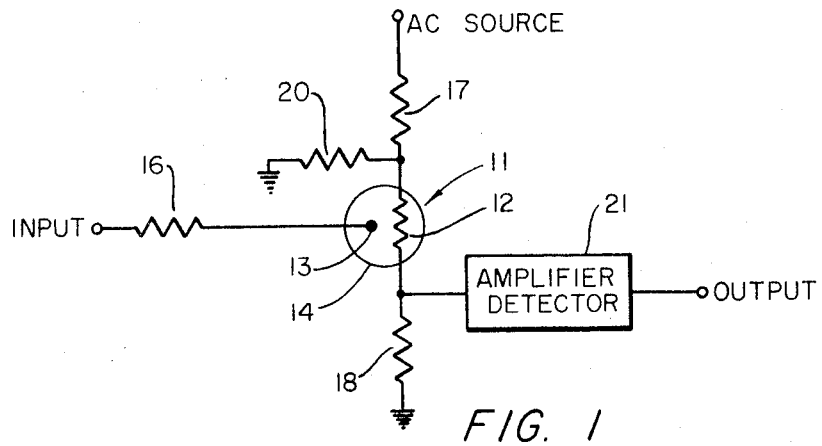
FIGURE 1 shows an integrator circuit employing adaptive memory elements.

Referring generally to FIGURE 1, an adaptive memory element is illustrated schematically at 11 and comprises a substrate element 12 which has a predetermined resistance and a source lead or electrode 13, all submerged in an electrolyte contained in envelope 14.

By applying a DC voltage between the source and the substrate, material can be reversibly plated between the source and substrate. Making the source electrode positive causes material to be plated onto the substrate which, in turn, causes its resistance to be lowered. Making the source electrode negative causes material to be removed, raising its resistance. Thus, the resistance or conductance of the memory element is adaptive in the sense that in the absence of plating current, the substrate will retain a given resistance while, with the application of plating current, the resistance will change in accordance therewith. In general, the resistance is read by applying AC current or voltage to the substrate element so that the readout is nondestructive to the stored information.

The memory element shown in FIGURE 1 is connected in an integrator circuit which may be suitable for use in an analog computer. The signal to be integrated is applied between the source electrode 13 and the substrate element 12 through a series resistor 16 (sufficient to limit plating current to a safe value for the largest input voltage).

The output integrated signal is obtained by applying an AC readout voltage to the series combination of substrate element 12 and resistor 18. The voltage can be obtained by applying an AC signal to the series combination of resistors 17 and 20 which has a relatively low impedance, and employing the voltage at the common junction. The voltage across the resistor 18 is essentially proportional to the conductance of the substrate element which is proportional to the amount of material plated. This amount is proportional to the integral of the plating current. The voltage across resistor 18 (also of relatively low impedance) is amplified by an amplifier and detected in amplifier-detector 21 which provides a DC output which is proportional to the integral of the input.

The integrator may also be used to integrate multiple inputs. Several input resistors 16 may be connected in parallel to the same source electrode. Integrators of this type have long leakage time constants and may be used when inputs are applied over very long periods of time. They serve to store the information even when the power is turned off.

An integrator of this type may be used as a pulse counter by counting the pulse input. The input pulses may be standardized, if necessary, with a one-shot multivibrator or a blocking oscillator. By connecting the integrator input to a fixed DC source and connecting the output to an indicating meter, it may be used as an indicating timer. An integrator circuit of this type may also be used for digital storage, combining several bits of storage in one memory element.

Figure 2:
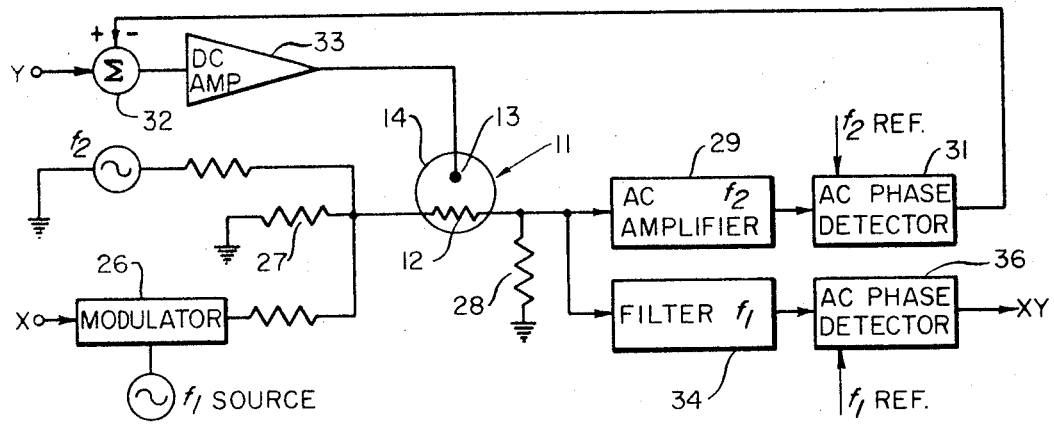
FIGURE 2 shows a multiplier circuit employing adaptive memory elements.

With appropriate additional circuitry, the integrator may be used as a highly accurate electronic multiplier. A multiplier circuit is shown in FIGURE 2. The X input is applied to modulator 26 where its amplitude modulates an AC voltage having frequency $f_1$. A fixed source provides AC voltage having a second frequency $f_2$. This voltage is added linearly to the first amplitude modulated voltage, and the sum is applied to one terminal of substrate element 12.

An input resistor 27 is connected between this terminal and ground. The other terminal of the substrate element 12 is connected to output resistor 28 having its other end end connected to ground. The output voltage is applied to a turned AC amplifier 29 which amplifies and filters out the portion of the output signal at frequency $f_2$. The output of the amplifier is phase detected at 31 and the output of the detector is applied to summer 32. The Y input signal is also applied to the summer 32 A DC amplifier 33 amplifies the output of the summer and applies the same to the source terminal 13.

Filter 34 is connected to receive the output voltage and pass the signal portion of frequency $f_1$ to AC phase detector 36. The output of the phase detector is the desired product of X and Y.

The multiplier circuit operates in the following manner. The fixed AC source having frequency $f_2$ develops a constant voltage component of frequency $f_2$ across resistor 27. The voltage component of frequency $f_2$ which appears across resistor 28 is not constant, but is proportional to the input signal Y by the action of the feedback loop, including AC amplifier 29, phase detector 31, the summing junction and DC amplifier 33. Thus, the ratio of the AC voltage component of frequency $f_2$ appearing across resistor 28 to that across resistor 27 is proportional to the input signal Y. The action of the modulator 26 causes an AC voltage component of frequency $f_1$ to appear across resistor 27 which is proportional to the input signal X. The substrate resistance 12 is insensitive to frequency over a very wide band of frequencies, and the frequencies $f_1$ and $f_2$ are chosen from within this band. Since the voltage division ratio in the series circuit consisting of resistor 27, substrate 12, and resistor 28 is the same at frequency $f_1$ as at frequency $f_2$, an AC component of voltage of frequency $f_1$ appears across resistor 28 which is proportional to both X and Y.

In essence, the substrate element is plated or deplated to cause the amplitude of the amplified component of frequency $f_1$ to be proportional to the input Y. The action of modulator 26 causes this component at resistor 28 to be also proportional to input X. Thus, the amplitude of the $f_1$ component, filtered by 34 and detected by 36, is proportional to the product XY.

Figure 3:
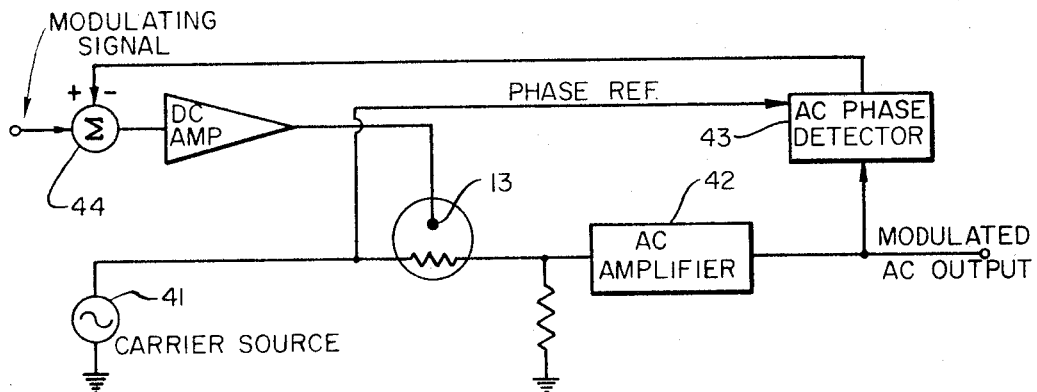
FIGURE 3 shows a modulator circuit employing adaptive memory elements.

The multiplier may be used as a linear modulator by replacing the modulator 26 in the circuit of FIGURE 2 with the carrier source and by replacing the Y input with the modulating signal, and omitting the X input. Such a circuit is shown in FIGURE 3 with the carrier source 41 applied to one terminal of the substrate. The other terminal of the substrate is connected to an amplifier 42 which provides the modulated output signal. A detector 43 receives the output and the detector output is applied to summer 44 which also receives the modulating signal. The summer output is amplified and applied to the source electrode 13. The summer output represents the "error" in a feedback loop. Plating and deplating are effected to drive the error to zero. Zero error corresponds to the situation where the amplitude of the AC output is precisely proportional to the input modulating signal.

We claim:

1. A circuit comprising a memory element including an electrolyte, a substrate having spaced terminals submerged in said electrolyte, a plating material in said electrolyte, means responsive to an electrical sum signal for reversibly plating said material on said substrate whereby the electrical resistance between the spaced terminals is controlled, means for applying an AC signal having a predetermined frequency to one terminal of said substrate, amplifying means connected to the other terminal of said substrate for amplifying the signal appearing at said other terminal to provide an amplified output signal, detecting means coupled to said amplifying means and responsive to the amplified output signal for providing a DC output signal, and summing means coupled to said detecting means for summing said DC output signal and an electrical input signal to provide said sum signal for reversibly plating material on said substrate.

2. A circuit as in claim 1 in which said summing means performs modulation of said DC output signal by said electric input signal and a DC amplifier coupled between the summing means and said means for reversibly plating.

3. A circuit comprising a memory element including an electrolyte, a substrate having spaced terminals submerged in said electrolyte, a plating material in said electrolyte, means responsive to an electrical sum signal for reversibly plating said material on the substrate whereby the electrical resistance between the spaced terminals is controlled, means for applying a first AC signal to one terminal of said substrate including a signal source having a first frequency and means for amplitude modulating said first frequency by a first input signal, means for applying a second AC signal having a second frequency to said one terminal, amplifying means connected to the other terminal of said substrate for amplifying only signals of said second frequency appearing thereat, means for summing the output of said amplifying means with a second input signal and providing a summed signal, means for applying said sum signal to the reversible plating means, and means connected to the other terminal of said substrate responsive to a signal appearing at said other terminal of said substrate which is at said first frequency for providing an output signal proportional to the product of the first and second input signals.

No references cited.

MALCOLM A. MORRISON, *Primary Examiner.*

FELIX D. GRUBER, *Assistant Examiner.*

U.S. Cl. X.R.

235—183; 307—299; 332—68; 340—173